(12) United States Patent
Brillaud

(10) Patent No.: US 12,241,786 B2
(45) Date of Patent: Mar. 4, 2025

(54) DEVICE AND METHOD FOR DETECTING THE PRESENCE, IN PARTICULAR A FALL OF A PERSON

(71) Applicant: Domalys, Fontaine-le-Comte (FR)

(72) Inventor: Arnaud Brillaud, Smarves (FR)

(73) Assignee: Domalys, Fontaine-le-Comte (FR)

( * ) Notice: Subject to any disclaimer, the term of this patent is extended or adjusted under 35 U.S.C. 154(b) by 505 days.

(21) Appl. No.: 17/623,079

(22) PCT Filed: Jun. 26, 2020

(86) PCT No.: PCT/EP2020/068065
§ 371 (c)(1),
(2) Date: Dec. 27, 2021

(87) PCT Pub. No.: WO2020/260609
PCT Pub. Date: Dec. 30, 2020

(65) Prior Publication Data
US 2022/0260422 A1    Aug. 18, 2022

(30) Foreign Application Priority Data

Jun. 27, 2019  (FR) ..................... 1907054

(51) Int. Cl.
| | |
|---|---|
| *G01J 5/12* | (2006.01) |
| *G01J 5/00* | (2022.01) |
| *G08B 21/04* | (2006.01) |
| *G01P 13/00* | (2006.01) |

(52) U.S. Cl.
CPC ............... *G01J 5/0025* (2013.01); *G01J 5/00* (2013.01); *G01J 5/12* (2013.01); *G08B 21/043* (2013.01); *G01J 2005/123* (2013.01); *G01P 13/00* (2013.01)

(58) Field of Classification Search
CPC ....... A61B 5/00; A61B 5/0004; A61B 5/0022; A61B 5/11; A61B 5/1112; A61B 5/0205; G08B 21/043; G08B 21/0469; G08B 21/0492; G01J 5/00; G01J 5/14; G01D 5/40

See application file for complete search history.

(56) References Cited

U.S. PATENT DOCUMENTS

| | | | |
|---|---|---|---|
| 10,225,492 B1 | 3/2019 | Steffanson et al. | |
| 2015/0323388 A1* | 11/2015 | Kostic ................... | A61B 5/11 5/425 |
| 2016/0287166 A1* | 10/2016 | Tran ..................... | A61B 5/74 |
| 2016/0328941 A1 | 11/2016 | Sundholm | |
| 2019/0239775 A1* | 8/2019 | Movva ................ | A61B 5/0017 |

FOREIGN PATENT DOCUMENTS

GB    2498951 A    8/2013

OTHER PUBLICATIONS

NPL Search (05/30/3034).*
International Search Report for corresponding PCT Application No. PCT/EP2020/068065 mailed Oct. 12, 2020.

* cited by examiner

*Primary Examiner* — Van T Trieu
(74) *Attorney, Agent, or Firm* — Wood, Phillips, Katz, Clark & Mortimer

(57) ABSTRACT

Disclosed is a device for detecting the fall of a person, comprising at least one matrix thermal sensor (2), preferably a matrix thermopile sensor.

16 Claims, 3 Drawing Sheets

[Fig. 1]
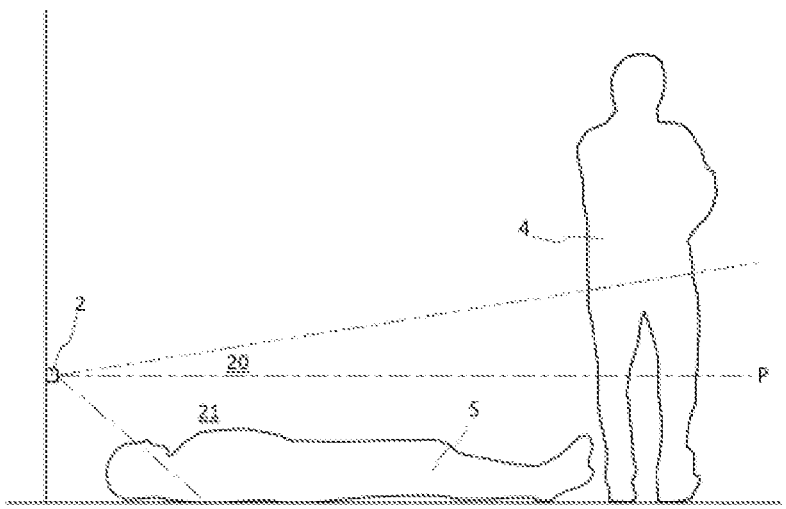
[Fig. 2]
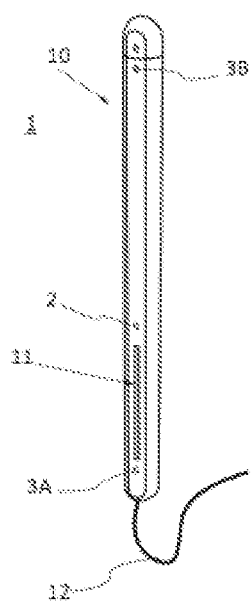

[Fig. 3]
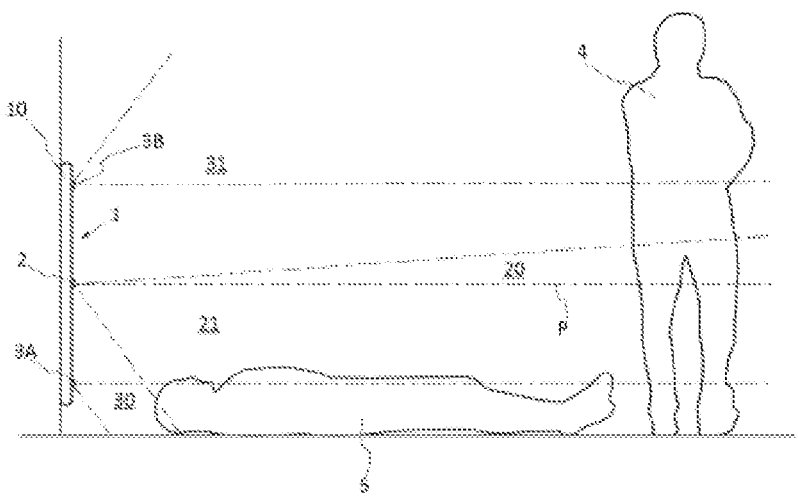
[Fig. 4]
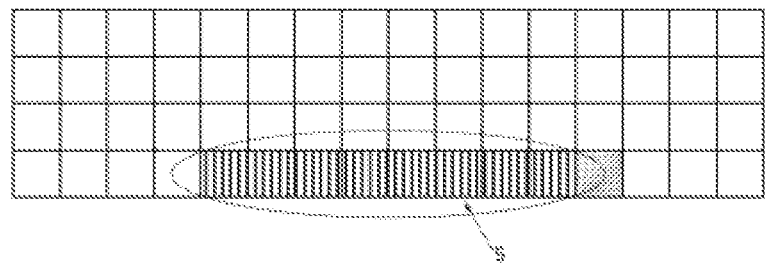
[Fig. 5]
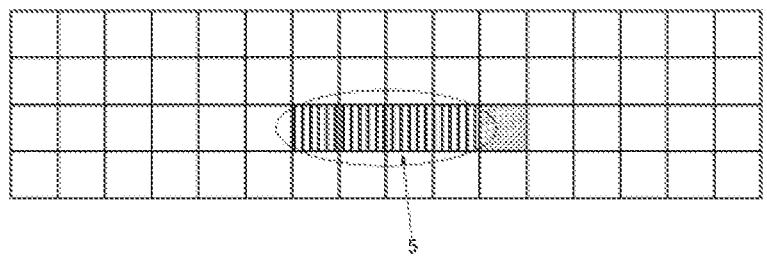

[Fig. 6]
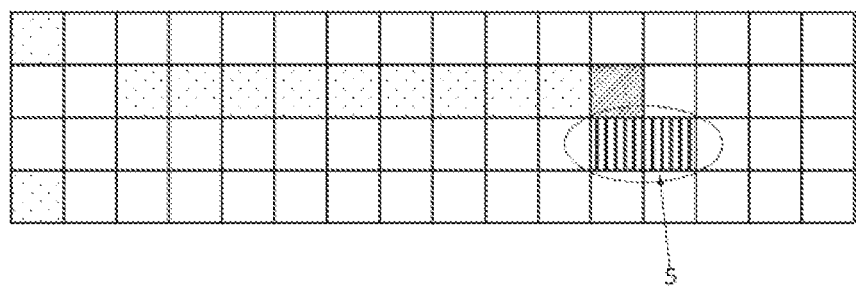
[Fig. 7]
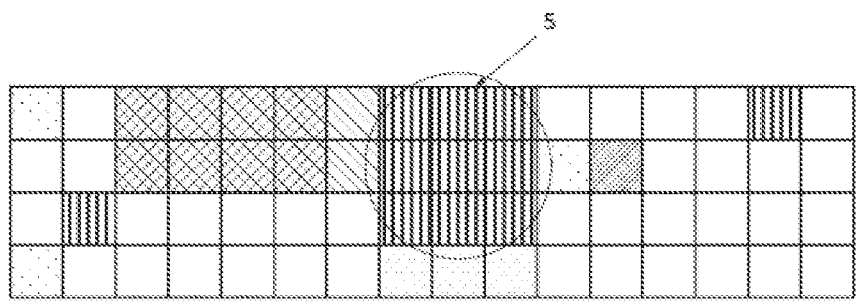
[Fig. 8]
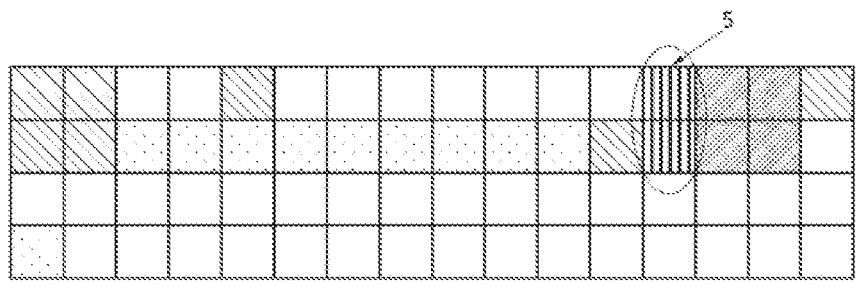

DEVICE AND METHOD FOR DETECTING THE PRESENCE, IN PARTICULAR A FALL OF A PERSON

BACKGROUND OF THE INVENTION

The invention relates to a device and a method for detecting the presence and in particular the fall of a person, which makes it possible to detect the fall of a person from a distance and in a reliable manner.

In the remainder of the description "fall of a person" means the detection of a fall of a person, or the detection of a plurality of falls of different persons by the fall detection device of the invention.

The invention will be described more particularly, but without being limited thereto, with respect to elderly people or people who have lost independence, people in hospital, people at risk of falls, etc.

People who have lost independence tend to get up in the night, for example to go to the toilet, and wander around in the dark. In these circumstances, the risk of falls is significant.

Detection systems are already known which comprise movement sensors which are located close to a bed in order to detect someone getting out of bed or falling out of bed, or in rooms of a home in order to detect a fall in the room. These movement sensors are preferably in pairs and offset in height in accordance with a high sensor and a low sensor. The high sensor detects any person standing and then checks, after a given period of time, whether the presence is still detected; when the presence is no longer detected, the low sensor possibly confirms the presence of the person in the region of the ground, and infers a fall therefrom.

However, even if these devices are successful, the risk of detection of false positives is not zero. False positives are for example a person seated in their armchair who moves the top of their body and then moves only their feet, or a person who leaves a room, passing in front of the device (all the more so if they are in a wheelchair), or a person who leaves a room when bent over, for example to do housework (hoovering, wiping the floor), or indeed a person to be monitored who is followed closely by a living being smaller than the person, such as a child or an animal.

The main aim of the invention is thus to minimize, or indeed suppress, the detection of false positives, by proposing a novel device and a novel method for fall detection, which are furthermore simple to install and implement.

BRIEF SUMMARY OF THE INVENTION

The invention thus relates to a device for detecting the fall of a person, comprising at least one matrix thermal sensor, preferably a matrix thermopile sensor.

Thus, the invention proposes a novel solution which is very effective in detecting the fall of a person. The matrix thermal sensor can detect an immobile person, which a passive infrared sensor cannot do, and furthermore provides a thermal image of the detected shape. Consequently, the detection device of the invention is a very effective solution compared with existing devices, and guarantees separation of the false positives.

According to one feature, the device comprises electronic processing means which integrate data of correspondence between the pixels of the matrix of the matrix thermal sensor and the detection zones of the matrix thermal sensor, and preferably the distances separating the matrix thermal sensor from the person or other hot element detected.

Thus, the device is capable of indicating, when a person is detected by the thermal sensor, whether they are standing or sitting, or provisionally towards the ground (for example bent to collect something, and thus constituting a false positive), or indeed on the ground having actually fallen. Moreover, the device advantageously makes it possible to identify the distance of the person (or other hot point detected) with respect to the matrix thermal sensor.

Advantageously, the matrix thermal sensor is designed for delimiting two distinct detection zones, one zone extending beyond the horizontal plane passing through the center of the matrix thermal sensor, and one zone extending below said plane. The device comprises electronic processing means for processing measurement data of the matrix thermal sensor, which detect a fall only if all the pixels detected as hot appear in the high zone and in the low zone at the same time, and then appear only in the low zone for a fixed minimum duration. This minimum period makes it possible to prevent the false positives if a person only bends to collect an object from the ground, for example.

According to a preferred feature, the device comprises electronic processing means equipped with an algorithm for detecting the position of the hottest point and the movements thereof with respect to the matrix thermal sensor. An algorithm of this kind makes it possible to improve the detection of false positives, and consequently to separate them without incorrectly signaling a fall, in particular for a person or an animal following the person to be monitored, and much lower in height, or for a fixed object in the room which emits heat.

In a variant, the device may comprise the matrix thermal sensor and other sensors, such as at least one movement sensor, preferably of the passive infrared type. In the case of using at least one movement sensor in addition to the matrix thermal sensor, in particular at least two movement sensors, these are preferably arranged such that the detection angular sector thereof, considered in a vertical plane, is not intersected in the detection zone. The fall detection device comprises electronic processing means which process the measurements of the matrix thermal sensor and at least one movement detection sensor, and are equipped with at least one processing algorithm using the measurement results of the matrix thermal sensor in order to complete or perfect the measurements of the movement detection sensors. The fall device of the invention thus makes it possible, via the matrix thermal sensor, to confirm the fall of a person who will have been detected by the movement sensors of the passive infrared operation type, or to disprove the fall of a person (case in particular of a false positive detected by the passive infrared movement sensors).

In particular, the matrix thermal sensor is implemented only if a loss of verticality is detected by the movement sensors; when a loss of verticality is detected, the matrix thermal sensor, which comprises at least two detection zones, one zone referred to as high and one zone referred to as low, is implemented, and the measurement results thereof are used in the following manner: if the matrix thermal sensor detects a presence in the high zone, the fall is unconfirmed, the person ultimately being in a standing or sitting position, and if the matrix thermal sensor detects a person only in the low zone, the fall is confirmed. In this detection configuration, the querying of the movement sensors takes place in a loop, as long as a loss of verticality has not been detected.

According to another feature, the detection device comprises communication means for remote transmission of at least one item of information relating to the detection of a fall of a person, and preferably the data of said at least one matrix thermal sensor and optionally the data of other sensors such as one or more movement sensors.

Advantageously, the matrix thermal sensor is located at a height corresponding to a plane at the height of the legs of a standing person, in particular substantially at the height of the knees of a standing person, or at the plane of a bed, and if at least two movement sensors are added, the first movement detection sensor is positioned close to the ground, and the second movement detection sensor is positioned above a plane substantially corresponding to the height of the pelvis of a standing person, or at the height of the shoulders of a seated person, or above the upper plane of a bed.

Advantageously, the detection device comprises a one-piece elongate body, in the manner of a column, comprising, at least on the outside, said at least one matrix thermal sensor, and optionally at least one or at least two movement sensors which are arranged close to the two respective distal ends of the body, said at least matrix thermal sensor being arranged between the two movement sensors. Said one-piece body preferably integrates a lighting system.

The detection device may comprise a lighting system and at least one brightness sensor, the lighting system being activated depending on the brightness and the detection of movement, in particular the lighting being activated if the brightness in the detection zone is below a threshold value, the detection device preferably comprising a regulation which is configured to progressively increase the light intensity emitted by the lighting system at the moment of its activation.

The device may comprise at least one camera and/or other functional detection elements, such as temperature sensors of the room in which the device is located, humidity sensors, carbon monoxide sensors, smoke sensors.

The device may comprise voice control systems with integration of sound reception and transmission means.

The present invention will now be described with reference to examples, which are given merely by way of example and in no way limit the scope of the invention, and on the basis of the accompanying drawings, in which:

BRIEF DESCRIPTION OF THE DRAWINGS

FIG. 1 shows the device for the fall of a person according to the invention, in relation to an embodiment comprising a matrix thermal sensor.

FIG. 2 is a perspective view of a fall detection device according to an embodiment, in the form of a one-piece module furthermore integrating movement sensors.

FIG. 3 is a schematic side view of the device of FIG. 2 that is installed against a wall and is capable of detecting a person standing, or lying on the ground, indicating that they have fallen.

FIG. 4 is a schematic view of the raster mapping in pixels displayed by the matrix thermal sensor for a first example of a position of a person.

FIG. 5 shows the raster mapping according to a second example of positioning of a person.

FIG. 6 is a third example of raster mapping.

FIG. 7 is a fourth example of raster mapping.

FIG. 8 is a fifth example of raster mapping.

DETAILED DESCRIPTION OF THE INVENTION

The presence detection device 1 of the invention, shown in FIGS. 1 to 3, aims to detect a person moving in a room, and their possible falling, while separating false positive detection results.

According to the invention, the device 1 comprises at least one matrix thermal sensor 2 (FIG. 1), and optionally at least one movement detection sensor 3A and/or 3B (FIGS. 2 and 3).

In the embodiment shown in FIGS. 2 and 3, the presence detection device 1 is preferably present in the form of a one-piece module 10 which advantageously makes it possible to gather together all the technical fall detection means, and even lighting 11, so as to acquire a system that is simple for the installer to implement.

The module 10 is preferably in the form of an elongate body, such as a one-piece column.

The matrix thermal sensor 2 is preferably a matrix thermopile sensor.

The movement detection sensors 3A and 3B are preferably passive infrared detectors. When two movement sensors 3A and 3B are present, these are offset with respect to height.

FIGS. 1 and 3 schematically show a standing person 4 or a person on the ground 5, having fallen, which the device 1/the module 10 will detect.

The device 1 comprises electronic processing means for the measurement data of the sensors 2, 3A and 3B, such as at least one microprocessor and at least one computer program comprising one or more processing algorithms. Said electronic processing means are preferably also integrated in the module 10. The device 1/the module 10 further comprises communication means which are connected to the electronic processing means for the purpose of remote communication of at least one item of information relating to the detection, such as at least one alarm signal in the case of a detected fall.

Finally, all the elements that require an electrical supply are connected, inside the body of the module 10, to a common supply which is connected to an external supply wire 12, itself able to be connected to a power outlet. The module is easy to implement, being ready for connection and operation (of the "plug and play" type).

The matrix thermal sensor 2 is designed to receive information relating to the detection temperature zones according to two detection angular sectors delimited, on the one hand, by a horizontal plane P passing through the center of said thermal sensor and extending above said plane P so as to cover a zone referred to as high 20, and, on the other hand, through said horizontal plane P passing through the center of the thermal sensor and extending below said plane so as to cover a zone referred to as low 21.

By way of example, the matrix thermal sensor 2 covers, for the high zone 20, a high angular sector (above the horizontal plane passing through the center of the thermal sensor) of the order of 10°, and, for the low zone 21, a low angular sector (below said horizontal plane passing through the center of the thermal sensor) of the order of 20° to 30°.

The electronic processing means make it possible to process the data of the matrix thermal sensor 2 in order to infer the presence of a hot body, whether said hot body is moving, the size of said hot body, and the position thereof in the detection zones. Advantageously, a suitable algorithm can also provide the distance of the hot body with respect to the matrix thermal sensor.

The device 1 of the invention can detect the presence of a plurality of people, and detect their possible fall.

In the embodiment shown, of the detection module 10, the matrix thermal sensor 2 and the movement detection sensors 3A and 3B are placed vertically, according to a vertical alignment. The movement detection sensors 3A and 3B are spaced apart according to the height, in particular close to each distal end, respectively, of the module. The matrix thermal sensor 2 is positioned between the two movement detection sensors 3A and 3B, in particular much closer to the sensor 3A of the low end.

In another embodiment of the fall device, the matrix thermal sensor and the movement sensors are positioned at distinct locations, not necessarily according to a vertical line.

In the embodiment of the module of FIGS. 2 and 3, the first movement detection sensor 3A is positioned close to the ground, for example in the region of 10 to 20 cm from the ground. The second movement detection sensor 3B is positioned above a plane substantially corresponding to the height of the pelvis or the torso of a standing person, or at the height of the shoulders of a seated person, or above the upper plane of a bed. The matrix thermal sensor 2 is located at a height corresponding to a plane at the height of the legs of a standing person, in particular substantially at the height of the knees of a standing person, or at the height of the plane of a bed.

Thus, when the device 1 forms the one-piece detection module 10, this is installed at a distance from the ground, for example in the region of 10 to 20 cm from the ground, the two movement detection sensors 3A and 3B being in the region of between 70 and 110 cm distant from one another, while the matrix thermal sensor 2 is in the region of 20 cm above the low end sensor 3A.

The two low 3A and high 3B movement detection sensors are preferably designed to receive detection waves according to an angular sector which is limited in the vertical plane, in order that the angular sector of one does not meet the angular sector of the other. Thus, the low sensor 3A will detect a zone referred to as low 30, which corresponds to the low part of a person, while the high sensor 3B will detect a zone referred to as high 31, which corresponds to the upper part of a person. The aim of the movement sensors 3A and 3B is to detect a loss of verticality of a moving person. In the case of a loss of verticality, since the angular sectors do not cover one another, the electronic processing means will analyze a loss of verticality when the low sensor 3A detects a presence in the low zone 30 thereof, while the high sensor 3B will not detect any presence in the high zone 31 thereof.

By way of example, each movement detection sensor 3A, 3B covers an angular sector, for example in the region of 45° with respect to a horizontal median plane passing through the center of the sensor.

The matrix thermal sensor 2 makes it possible to ensure the result of the movement detection sensors, low 3A and high 3B, when they detect a loss of verticality which presupposes a fall, and to confirm or disprove the possible fall. The matrix thermal sensor 2 is designed to receive information relating to the detection temperature zones according to the two detection zones thereof, low and high. The detection angular sectors of the thermal sensor 2 can cut the detection sectors of the movement sensors 3A and 3B without disrupting the detection results.

The device 1 preferably comprises, via the electronic processing means thereof, a processing algorithm for processing the data of the various sensors 2 and 3A, 3B, which processes the data in order to ensure, from the results of the matrix thermal sensor 2, the correctness of the result of a detection of loss of verticality and a fall by the movement sensors 3A and 3B. In this variant, only the movement sensors 3A and 3B are permanently operational, while the thermal sensor 2 is implemented when a loss of verticality is detected, and makes it possible to verify whether or not this is actually a fall.

According to the invention, when a fall is confirmed by the device of the invention, the electronic processing means send an alarm signal remotely.

The alarm signal may be associated with other remote data transmissions, for example the presence of a person in the room, their position in the room, the number of people in the room, the presence of an animal, the presence of the person in the bed or in an armchair, or to various triggers, for example the triggering of a camera in the room.

The fall detection device is capable of remote transmission, on request, of the information on the presence or otherwise of a person in the field of vision of the device.

The fall detection device can also comprise a voice control and loudspeaker system.

The fall detection device may also comprise a luminotherapy system coupled to the automatic lighting system.

The operation of the device 1 for detecting the fall of a person, according to the invention, is now described. The matrix thermal sensor 2 provides the electronic processing means with a pixel matrix of the detected image opposite it, distinguishing on the pixels the temperature differences detected. The matrix represents an image of the volume of the room in front of the detection device 1. The temperatures will be higher for the hot zones, and lower for the cold zones. Then, depending on the location of the temperature of the pixels, the electronic processing means infer the position in space of a hot body with respect to the device 1/module 10, and the size of said hot body. The data processing algorithm comprises reference elements for ensuring a correspondence between, on the one hand, the zones of the pixel matrix, the size of the pixels (which is fixed for a sensor and can be different depending on the sensors), and the temperature of the pixels with respect to their position in the matrix, and, on the other hand, the mapping of the analyzed space in the room, distinguishing the high 20 and low 21 zones, and the real dimensions in space. Furthermore, the algorithm can be designed to provide the distance separating the hot body from the matrix thermal sensor.

When the device comprises only one matrix thermal sensor 2, the detection of a fall which corresponds to a detection of a loss of verticality is achieved by means of a real-time analysis of the pixels detected as "hot": the electronic processing means detect all the hot pixels referred to as "blobs," which are then assimilated to a human being, an animal, an exterior heating element, etc. The detection of a loss of verticality is always based on the two zones referred to as high and low: a blob moving in the two zones simultaneously corresponds to a person moving, upright or in a moving wheelchair; a blob moving in the two zones simultaneously and then appearing only in the low zone corresponds to a person who has fallen; a blob moving only in the low zone from its entry into the field of vision of the sensor may correspond to an animal. A distinction is made between the different blobs detected, for example a person and their pet that follows them, which makes it possible to detect a fall despite the presence of another hot body in the field of vision of the sensor.

If two blobs meet, the electronic processing means can always differentiate them, due to the temperatures of the pixels making them up, for example an animal passing between a seated person and the fall detection device will not be of the same body temperature as said person, which will make it possible to retain the multiplicity of the blobs.

A fall is detected only if a blob appears in the high zone and in the low zone at the same time, and then appears only in the low zone for a fixed minimum duration. This minimum period makes it possible to prevent the false positives if a person only bends to collect an object from the ground, for example. The electronic processing means are capable of following a blob in real time, and of understanding its movements, even if this has been divided into two in the case of poor detection of a pixel, in particular in order to avoid the false positives due to exiting a room, for example exiting backwards in a wheelchair, where the last pixels of the blob would correspond to the feet of the person and would therefore be considered to be in the low zone.

FIGS. 4 to 8 show comparative examples of matrices for different situations of people detected by the matrix thermal sensor 2. Depending on the temperature detected, the pixels are of different temperatures, which are shown here by different patterns. The pixels which have vertical stripes and are schematically surrounded correspond to a detected hot body, of a temperature corresponding to that of the human body. The three top rows of pixels correspond to the high zone 20, while the lower line of pixels corresponds to the low zone 21.

FIG. 4 corresponds to a person 5 who is lying on the ground 1 m in front of the detection device 1, the body being in parallel with the wall to which the detection device is fixed.

FIG. 5 shows a person 5 who is lying on the ground 2 m in front of the detection device, the body being in parallel with the wall to which the detection device is fixed.

FIG. 6 corresponds to a person 5 who is lying on the ground 4 m in front of the detection device and in a direction perpendicular to the wall to which the device is fixed.

FIG. 7 corresponds to a person who is sitting in an armchair 2 m in front of the detection device.

FIG. 8 corresponds to a standing person 4 who is located 4 m from the detection device.

Thus, the electronic processing means analyze:
whether the person is located only in the low zone, which is equivalent to a loss of verticality, and at what distance from the detection device;
whether the detection is performed in the high zone and the low zone at the same time, which means that the person is standing or sitting;
whether the person is located only in the high zone, which means that the person is standing at a certain distance from the detection device, in this case approximately 5 m from the detection device.

In the case of a heating element other than a person, for example a window or a radiator, the electronic processing means detect "hot" pixels which are fixed, and temporarily ignores them in order to nonetheless ensure the detection of the person.

Finally, in order to separate false positives, such as an element that is moving and is smaller in size than a standing person (for example an animal or a child), the electronic processing means detect, in the pixel matrix of the matrix thermal sensor 2, the position of the hottest point, and the movements thereof.

When the fall detection device 1 of the invention comprises a matrix thermal sensor 2, and for example two passive infrared movement sensors 3A and 3B, the steps implemented by the algorithm are as follows:
detection of a loss of verticality via the movement sensors 3A and 3B, and when a loss of verticality is not detected, the querying of said movement sensors takes place in a loop;
when a loss of verticality is detected, detection of the position of the person by the matrix thermal sensor 2;
detection of the person in the high zone 20: if the matrix thermal sensor 2 detects a presence in the high zone, the fall is disproved, the person ultimately being in a standing or sitting position, and in this case the measuring result of the low zone may make it possible, in combination (according to the associated algorithm), to know the distance of the person from the detection device;
detection of a person in the low zone 21 when the matrix thermal sensor 2 has not detected a person in the high zone 20: if the matrix thermal sensor 2 detects a person in the low zone then the fall is confirmed, whereas if it does not detect a person in the low zone the fall is disproved, meaning, for example, that the room is empty.

What is claimed is:

1. A wall-mounted fall detection device comprising:
at least one matrix thermal sensor (2), configured to provide a matrix in pixels of an image detected in front of it by distinguishing on the pixels the differences in temperatures detected, the matrix representing an image of the volume of the part facing the detection device; the matrix thermal sensor being designed to delimit two distinct detection zones, one zone (20) extending above the horizontal plane passing through the center of the matrix thermal sensor, and one zone (21) extending below said plane;
electronic means for processing measurement data from the thermal matrix sensor, incorporating correspondence data between the pixels of the thermal matrix sensor matrix and the detection zones provided by the thermal matrix sensor; the electronic processing means being provided with an algorithm for detecting the position of the hottest point and its displacements relative to the thermal matrix sensor; the electronic processing means detecting a fall only if a set of pixels detected as hot appears in both the high zone (20) and the low zone (21), and then appears only in the low zone for a fixed minimum duration.

2. The fall detection device according to claim 1, characterized in that the device further comprises at least one motion sensor.

3. The fall detection device according to claim 1, characterized in that the device comprises electronic processing means which process the measurements of the thermal matrix sensor (2) and at least one motion detection sensor (3A, 3B), and are equipped with at least one processing algorithm using the measurement results of the matrix thermal sensor in order to process the measurements of the motion detection sensors.

4. The fall detection device according to claim 3, characterized in that the thermal matrix sensor (2) is activated only if a loss of verticality via the motion sensors (3A, 3B) is detected; when a loss of verticality is detected, the thermal matrix sensor (2), which has at least two detection zones, one high zone (20) and a low zone (21), is implemented and its measurement results are used as follows: if the thermal matrix sensor detects a presence in the high zone, the fall is invalidated, and if the thermal matrix sensor detects a person only in the low zone, the fall is confirmed.

5. The fall detection device according to claim 1, characterized in that the device comprises communication means for remote transmission of at least one item of information relating to the detection of a fall of a person.

6. The fall detection device according to claim 1, characterized in that the matrix thermal sensor (2) is located at a height of the knees of a standing person, or at the plane of a bed, and in that, if at least two motion sensors are added, the first motion detection sensor (3A) is positioned close to the ground, and the second motion detection sensor (3B) is positioned above a plane substantially corresponding to the height of the pelvis of a standing person, or at the height of the shoulders of a seated person, or above the upper plane of a bed.

7. The fall detection device according to claim 1, characterized in that the device has an elongated, column-like, one-piece body comprising, at least at the front, said at least one matrix thermal sensor (2), and optionally at least one or at least two motion sensors (3A, 3B) which are arranged close to the two respective distal ends of the body, said at least one matrix thermal sensor being arranged between the two motion sensors.

8. The fall detection device according to claim 1, characterized in that it comprises at least one camera and/or other functional detection elements.

9. The fall detection device according to claim 1, characterized in that it comprises voice command systems with integrated sound reception and transmission means.

10. The fall detection device according to claim 2, wherein the at least one motion sensor is of the passive infrared type.

11. The fall detection device according to claim 2, wherein the at least one motion sensor comprises two motion sensors (3A, 3B).

12. The fall detection device according to claim 11, wherein the two motion sensors (3A, 3B) are arranged such that the detection angular sector considered in a vertical plane does not intersect in the detection zone.

13. The fall detection device according to claim 5, wherein the communication means is configured for remote transmission of the data of said at least one matrix thermal sensor.

14. The fall detection device according to claim 5, wherein the communication means is configured for remote transmission of the data of one or more motion sensors.

15. The fall detection device according to claim 7, wherein the one-piece body incorporates a system lighting (11).

16. The fall detection device according to claim 8, wherein the device comprises one or more of temperature sensors of the room in which the device is located, humidity sensors, carbon monoxide sensors, or smoke sensors.

\* \* \* \* \*